United States Patent
Hummelshøj

(10) Patent No.: US 10,860,020 B2
(45) Date of Patent: Dec. 8, 2020

(54) SYSTEM AND METHOD FOR ADAPTIVE PERCEPTION IN A VEHICLE

(71) Applicant: Toyota Research Institute, Inc., Los Altos, CA (US)

(72) Inventor: Jens Strabo Hummelshøj, Burlingame, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 411 days.

(21) Appl. No.: 15/877,756

(22) Filed: Jan. 23, 2018

(65) Prior Publication Data

US 2019/0227549 A1 Jul. 25, 2019

(51) Int. Cl.
*G05D 1/00* (2006.01)
*G05D 1/02* (2020.01)

(52) U.S. Cl.
CPC ......... *G05D 1/0088* (2013.01); *G05D 1/0257* (2013.01)

(58) Field of Classification Search
None
See application file for complete search history.

(56) References Cited

U.S. PATENT DOCUMENTS

| | | | |
|---|---|---|---|
| 8,396,249 B1 | 3/2013 | Khosla et al. | |
| 8,593,272 B2 | 11/2013 | Heracles et al. | |
| 8,649,606 B2 | 2/2014 | Zhao et al. | |
| 8,989,972 B2 * | 3/2015 | Anderson | B60Q 5/001 701/51 |
| 9,097,800 B1 * | 8/2015 | Zhu | G01S 17/42 |
| 9,381,916 B1 * | 7/2016 | Zhu | G01S 13/931 |
| 9,495,874 B1 * | 11/2016 | Zhu | G08G 1/165 |
| 9,594,378 B2 | 3/2017 | Laur et al. | |
| 9,609,289 B2 | 3/2017 | Schofield et al. | |
| 9,778,661 B2 | 10/2017 | Wang et al. | |
| 9,836,895 B1 * | 12/2017 | Nygaard | G07C 5/0841 |
| 10,126,136 B2 * | 11/2018 | Iagnemma | G05D 1/0088 |
| 10,192,113 B1 * | 1/2019 | Liu | G06K 9/00664 |
| 2005/0058322 A1 | 3/2005 | Farmer et al. | |
| 2006/0050953 A1 | 3/2006 | Farmer et al. | |
| 2015/0339589 A1 | 11/2015 | Fisher | |

* cited by examiner

*Primary Examiner* — Richard M Camby
(74) *Attorney, Agent, or Firm* — Christopher G. Darrow; Darrow Mustafa PC

(57) ABSTRACT

System, methods, and other embodiments described herein relate to selectively processing sensor data to perceive aspects of a surrounding environment of a vehicle. In one embodiment, a method includes, in response to identifying attributes of the surrounding environment from sensor data of one or more sensors, selecting a perception technique from a plurality of perception techniques according to a human-based perception model that correlates the plurality of perception techniques with the attributes to identify which of the plurality of perception techniques efficiently process the sensor data. The method includes analyzing the sensor data using the perception technique to perceive characteristics of the surrounding environment that pertain to autonomously controlling the vehicle. The method includes autonomously controlling the vehicle according to the characteristics to navigate through the surrounding environment.

20 Claims, 5 Drawing Sheets

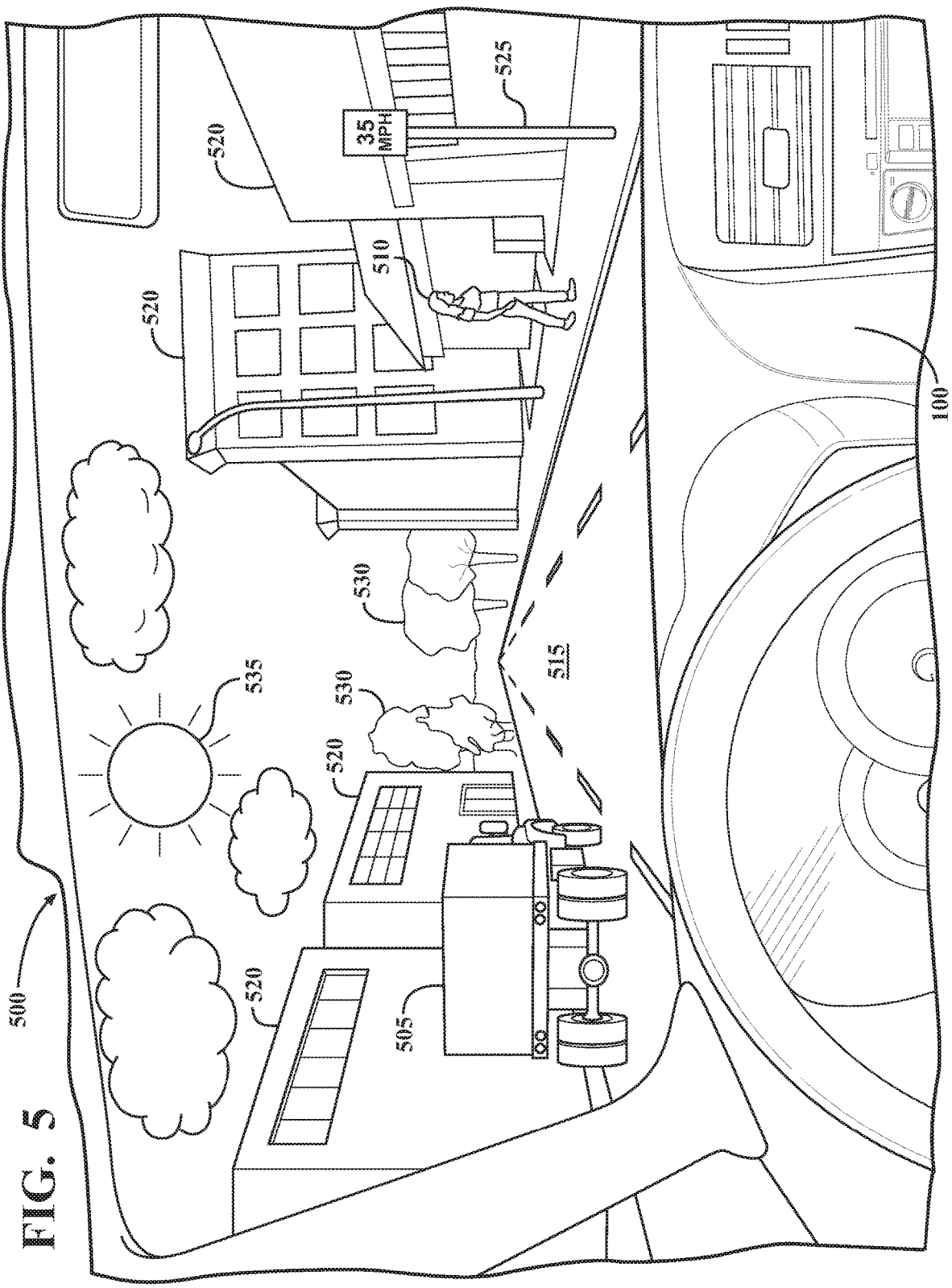

SYSTEM AND METHOD FOR ADAPTIVE PERCEPTION IN A VEHICLE

TECHNICAL FIELD

The subject matter described herein relates, in general, to a system and method for dynamically adapting how a vehicle perceives a surrounding environment and, more particularly, to dynamically adjusting perception techniques for analyzing sensor data according to a human-based perception model.

BACKGROUND

Vehicles may be equipped with sensors that facilitate perceiving other vehicles, obstacles, pedestrians, and additional aspects of a surrounding environment. For example, a light detection and ranging (LIDAR) sensor uses light/lasers to scan the surrounding environment, while logic associated with the LIDAR analyzes acquired scan data to detect a presence of objects and other features of the surrounding environment. In further examples, additional sensors such as cameras, radar, and so on may be implemented along with the LIDAR in a combined effort to analyze and identify aspects of the surrounding environment. In this way, an autonomous robot (e.g., autonomous vehicle) can perceive the surrounding environment and determine how to navigate and avoid obstacles within the surrounding environment.

However, analyzing data about the each aspect within the surrounding environment, especially for multiple separate sensors, represents a significant computational effort. That is, processing the large quantity of sensor data is a task that can consume a significant amount of computational time and resources. Thus, quickly making decisions within the context of a moving vehicle/robot can present difficulties associated with either accurately perceiving the surrounding environment through more extensive computations or prioritizing the speed of computations at the detriment of accuracy.

SUMMARY

In one embodiment, example systems and methods relate to a manner of improving how a machine perceives a surrounding environment by adaptively modifying which perception techniques process incoming sensor data. Thus, the disclosed approach selects perception techniques for processing the sensor data according to which of the techniques efficiently process sensor data according to a human-based perception model. As indicated previously, applying a brute force approach to process all of the sensor data can be computationally intensive. This is especially true within the context of a vehicle which can be continuously moving through an environment and acquiring additional data that is to be processed on a nearly continuous basis. Accordingly, the presently disclosed systems and methods are generally directed to improving perception for robotic devices (e.g., autonomous vehicles) by selectively focusing on subsets of the sensor data to process and a manner in which the sensor data is processed.

In general, the perception system implements a plurality of perception techniques that are, in one embodiment, focused on aspects relating to controlling the vehicle. That is, the techniques focus on aspects of the surrounding environment that are relevant to controlling the vehicle and processing the associated sensor data in a manner that optimizes information acquired therefrom for use by, for example, an autonomous driving system. In this way, the perception system can improve the efficiency of processing the sensor data by focusing on aspects that are relevant to and affect the control of the vehicle.

Moreover, the disclosed perception systems and associated methods generally achieve the improved performance through implementation of a human-based perception model. In one embodiment, the human-based perception model is a machine learning algorithm such as a neural network that has been trained according to how a human operator of a vehicle perceives an environment when driving. Thus, the perception system uses the human-based perception model to, for example, determine which of the perception techniques are best suited for attributes of the presently acquired sensor data. Consequently, the perception system can adapt how the surrounding environment is perceived in a dynamic manner and according to changes in the surrounding environment. In this way, the disclosed systems and methods avoid using a brute force approach to machine vision and, therefore, improve processing efficiency and overall perception of the vehicle through a focused approach.

In one embodiment, a perception system for selectively processing sensor data to perceive aspects of a surrounding environment of a vehicle is disclosed. The perception system includes one or more processors and a memory communicably coupled to the one or more processors. The memory stores a selection module including instructions that when executed by the one or more processors cause the one or more processors to, in response to identifying attributes of the surrounding environment from the sensor data, select a perception technique from a plurality of perception techniques according to a human-based perception model that correlates the plurality of perception techniques with the attributes to identify which of the plurality of perception techniques efficiently process the sensor data. The memory stores a sensor module including instructions that when executed by the one or more processors cause the one or more processors to analyze the sensor data using the perception technique to perceive characteristics of the surrounding environment that pertain to autonomously controlling the vehicle. The sensor module includes instructions to autonomously control the vehicle according to the characteristics to navigate through the surrounding environment.

In one embodiment, a non-transitory computer-readable medium for selectively processing sensor data to perceive aspects of a surrounding environment of a vehicle and including instructions that when executed by one or more processors cause the one or more processors to perform one or more functions. The instructions include instructions to, in response to identifying attributes of the surrounding environment from the sensor data of one or more sensors, select a perception technique from a plurality of perception techniques according to a human-based perception model that correlates the plurality of perception techniques with the attributes to identify which of the plurality of perception techniques efficiently process the sensor data. The instructions include instructions to analyze the sensor data using the perception technique to perceive characteristics of the surrounding environment that pertain to autonomously controlling the vehicle. The instructions include instructions to autonomously control the vehicle according to the characteristics to navigate through the surrounding environment.

In one embodiment, a method for selectively processing sensor data to perceive aspects of a surrounding environment of a vehicle disclosed. In one embodiment, a method includes, in response to identifying attributes of the surrounding environment from sensor data of one or more sensors, selecting a perception technique from a plurality of perception techniques according to a human-based perception model that correlates the plurality of perception techniques with the attributes to identify which of the plurality of perception techniques efficiently process the sensor data. The method includes analyzing the sensor data using the perception technique to perceive characteristics of the surrounding environment that pertain to autonomously controlling the vehicle. The method includes autonomously controlling the vehicle according to the characteristics to navigate through the surrounding environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 5 is an illustration of an example view of a surrounding environment as may be seen from within the vehicle.

DETAILED DESCRIPTION

Figure 1:
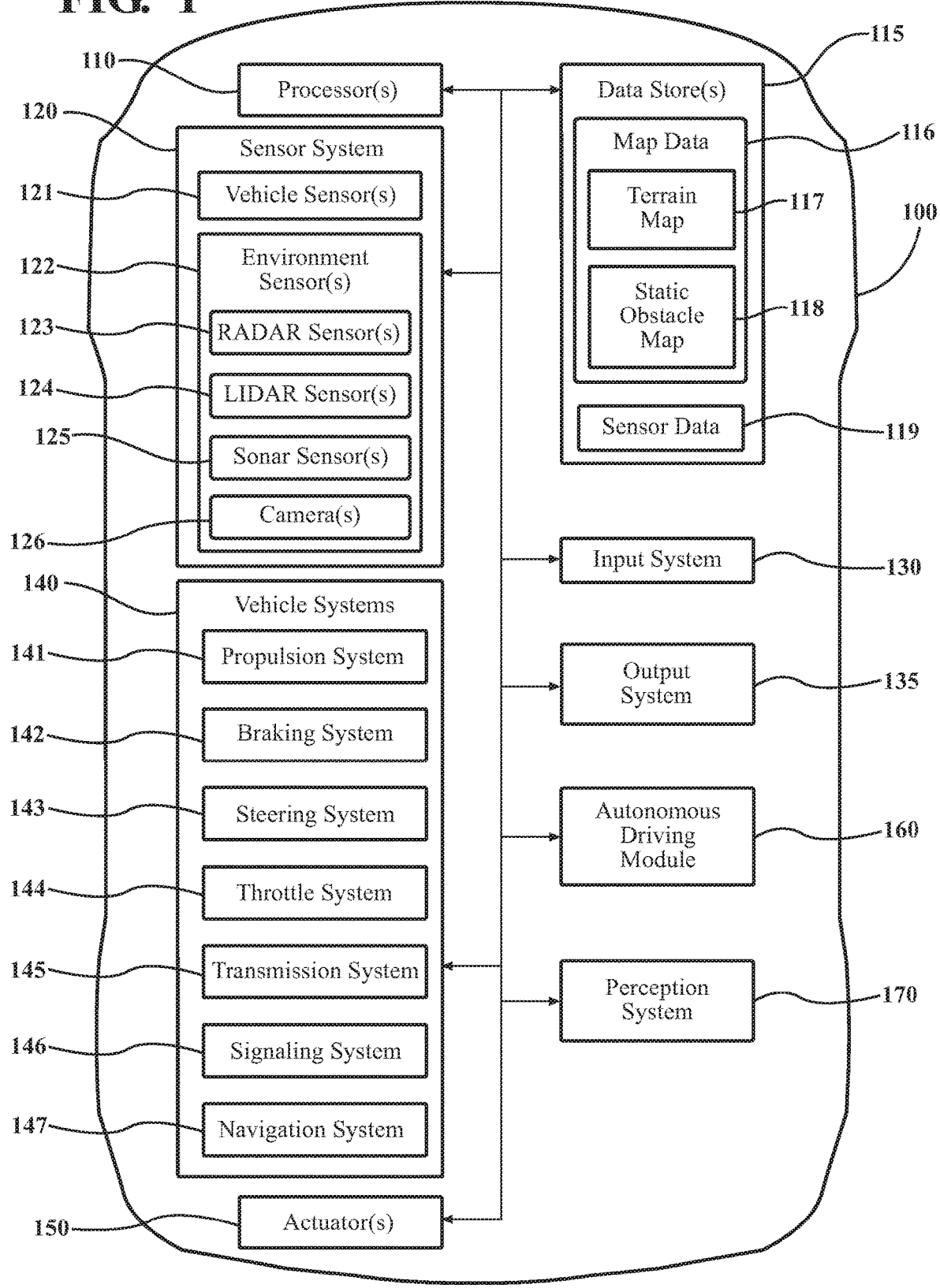
FIG. 1 illustrates one embodiment of a vehicle within which systems and methods disclosed herein may be implemented.

Systems, methods, and other embodiments associated with a manner of adaptively modifying the processing of incoming sensor data according to a human-based perception model are disclosed. As mentioned previously, a vehicle may include multiple sensors for perceiving aspects of the surrounding environment. Moreover, autonomous driving systems or other systems within the vehicle process sensor data from the sensors to perceive aspects of the surrounding environment. However, in general, the noted systems use a brute force approach to process the sensor data that can be computationally intensive and thus inefficient for use in time-sensitive and/or mobile applications.

Therefore, in one embodiment, a perception system and associated methods as disclosed herein provide for selectively processing the sensor data in a manner similar to how a human selectively processes aspects of a surrounding environment when operating a vehicle. That is, humans generally have innate perception abilities. In contrast to machines, human drivers make safe driving decisions while nonetheless using minimal effort to understand a surrounding environment. The underlying tenet is that human drivers use a small fraction of available sensory inputs to make decisions about how to safely operate the vehicle. Specifically, human drivers use movement patterns and the like to recognize dangers and other meaningful information about a surrounding environment. Humans can then selectively focus attention on the meaningful information, and largely ignore the remaining information about other aspects of the surrounding environment.

Accordingly, the presently disclosed perception system and associated methods implement functionality that provides for adaptively adjusting how the surrounding environment is perceived according to reverse engineered human driver perception. Thus, in one embodiment, the perception system implements a human-based perception model that functions to characterize the surrounding environment through at least attributes of the sensor data. As such, the perception system uses the human-based perception model to selectively implement one or more perception techniques that are particular to the combination of attributes, which achieves improvements to how efficiently the perception system processes the sensor data and perceives the surrounding environment. That is, the perception system uses the human-based perception model to determine an approach to perceive the present surrounding environment in a manner that uses computational resources efficiently to reduce overall computation and provide accurate information that the vehicle can use to implement at least semi-autonomous controls.

For example, in one aspect, the perception system initially trains the human-based perception model according to a training dataset that correlates machine vision/perception techniques with various sensor data and determinations of whether the particular techniques are sufficient for the noted sensor data. In one example, the perception system generates the training dataset through executing a training routine within a simulation environment (e.g., computer-generated environment).

In general, the training routine operates by varying visualizations of a driving scene that are displayed to an operator of the vehicle (i.e., in a simulation mode or within a separate simulator). The visualizations correlate with a form and style of information that may be used by different machine vision techniques to adapt how and which information is displayed to the operator. By varying the information displayed to the operator, the training routine assess, for example, ways in which the operator perceives the environment and correlates with the machine vision techniques under different circumstances. Thus, in one embodiment, the training routine dynamically varies which visualization algorithm modifies the visualization of the driving scene as a function of changing driving conditions, feedback about driving inputs, and/or according to other criteria. In this way, the training routine reverse engineers how a human operator perceives the surrounding environment while operating the vehicle and correlates the ways in which the human operator perceives the surrounding environment with machine vision techniques that correspond to the visualization algorithms. Accordingly, the training routine provides determinations of which machine vision techniques can improve perception under different driving circumstances using a select subset of sensor data in order to achieve improved perception with less computational effort.

Consequently, the perception system uses the training dataset produced from the training routine to train the human-based perception model to effectively perceive the surrounding environment by selecting and using perception techniques that employ a subset of available information. In one embodiment, the human-based perception model is a machine learning algorithm such as a neural network that accepts the sensor data as input and selects how the sensor data is to be efficiently processed or directly processes the sensor data according to a particular set of perception techniques. Thus, the perception system uses the human-based perception model to, for example, determine which of the perception techniques are best suited for attributes of the presently acquired sensor data and/or vehicle tasks/actions at hand. Consequently, the perception system can adapt how the surrounding environment is perceived in a dynamic manner and according to changes in the surrounding environment. In this way, the disclosed systems and methods avoid using a brute force approach to machine vision/perception.

Thus, the disclosed approach selects perception techniques for processing the sensor data according to which of the techniques can efficiently process sensor data with the particular attributes. Accordingly, the presently disclosed systems and methods are generally directed to improving perception for robotic devices (e.g., autonomous vehicles) by selectively focusing on subsets of the sensor data that are processed and a manner in which the sensor data is processed. In this way, the perception systems can improve the efficiency of processing the sensor data by focusing on aspects that are relevant to and affect the control of the vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a perception system 170 that is implemented to perform methods and other functions as disclosed herein relating to controlling the perception of the vehicle 100 by selectively adapting which perception techniques are applied to incoming sensor data according to a human-based perception model. The noted functions and methods will become more apparent with a further discussion of the figures.

Figure 2:
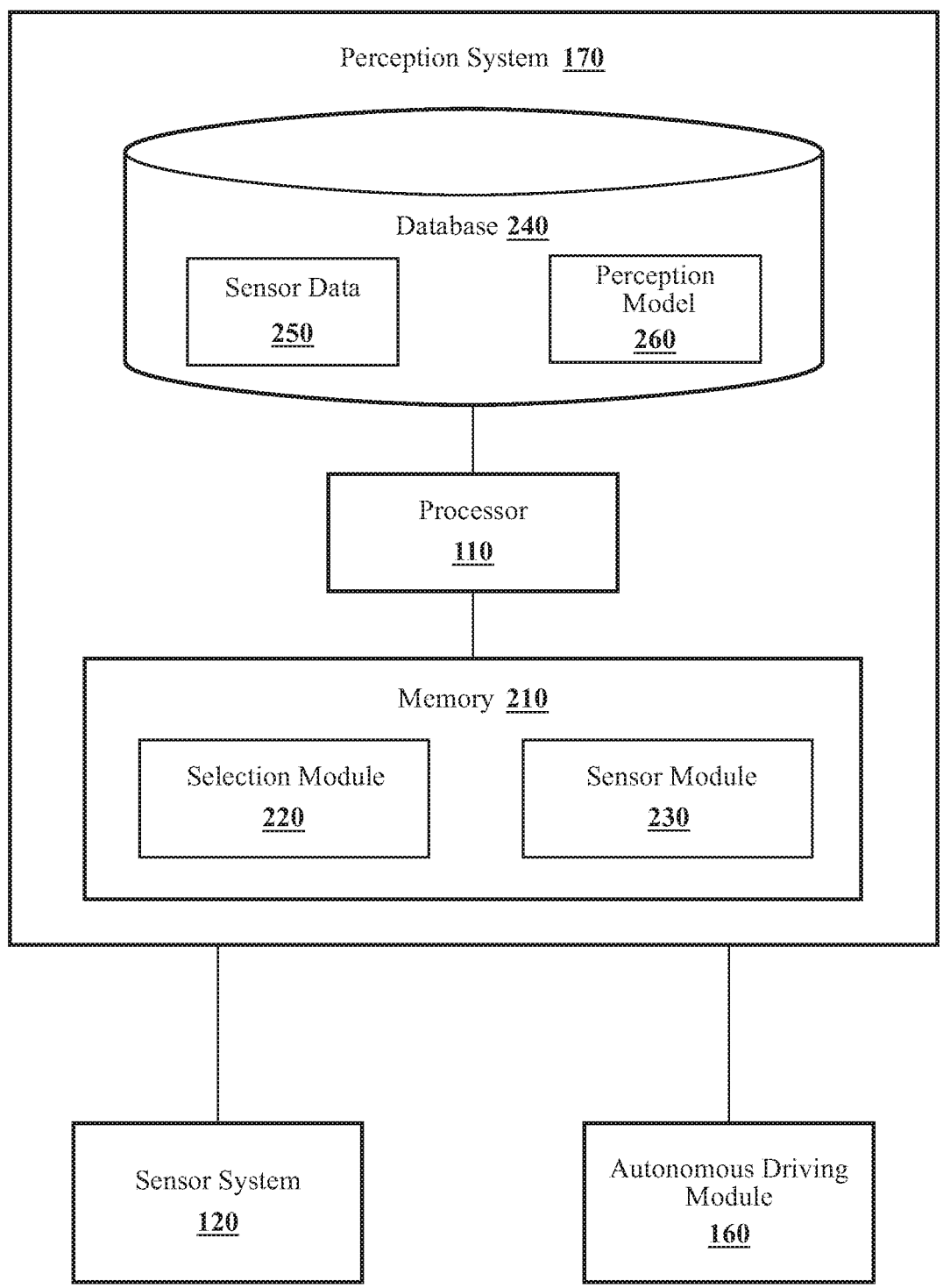
FIG. 2 illustrates one embodiment of a perception system that is associated with using a human-based perception model to adaptively perceive a surrounding environment of the vehicle.

With reference to FIG. 2, one embodiment of the perception system 170 of FIG. 1 is further illustrated. The perception system 170 is shown as including a processor 110 from the vehicle 100 of FIG. 1. Accordingly, the processor 110 may be a part of the perception system 170, the perception system 170 may include a separate processor from the processor 110 of the vehicle 100 or the perception system 170 may access the processor 110 through a data bus or another communication path. In one embodiment, the perception system 170 includes a memory 210 that stores a selection module 220 and a sensor module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the selection module 220 generally includes instructions that function to control the processor 110 to receive data inputs from one or more sensors of the vehicle 100 in the form of the sensor data 250. The sensor data 250 is, in one embodiment, scan data that embodies observations of a surrounding environment of the vehicle 100. In general, as provided for herein, the selection module 220 receives the sensor data 250 from a camera 126, LIDAR 124, radar 123, and/or other sensors that are integrated with the vehicle 100 or that provide information to the vehicle 100.

Furthermore, in one embodiment, the perception system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250 along with, for example, other information that is used by the modules 220 and 230.

For example, the scan data 250 can include 3D point cloud data along with, for example, metadata describing additional characteristics (e.g., location) of the scan. The scan data 250, in one embodiment, includes images, video, radar data, and so on. The sensor data 250 includes, in one embodiment, information regarding poses, sizes, relative shapes of objects, textures, distances, and so on.

Moreover, in one embodiment, the database 240 also includes the human-based perception model 260. As previously described, the model 260 correlates attributes of sensor inputs with particular perception techniques or sets of perception techniques for efficiently processing the sensor data 250. Thus, in one embodiment, as the selection module 220 receives the sensor data 250, the selection module 220 feeds the incoming sensor data 250 into the human-based perception model 260 in order to characterize the sensor data 250. That is, the selection module 220 uses the model 260 to identify attributes of the sensor data 250 from which the subsequent perception analysis is controlled to use particular ones of the perception techniques.

Figure 3:
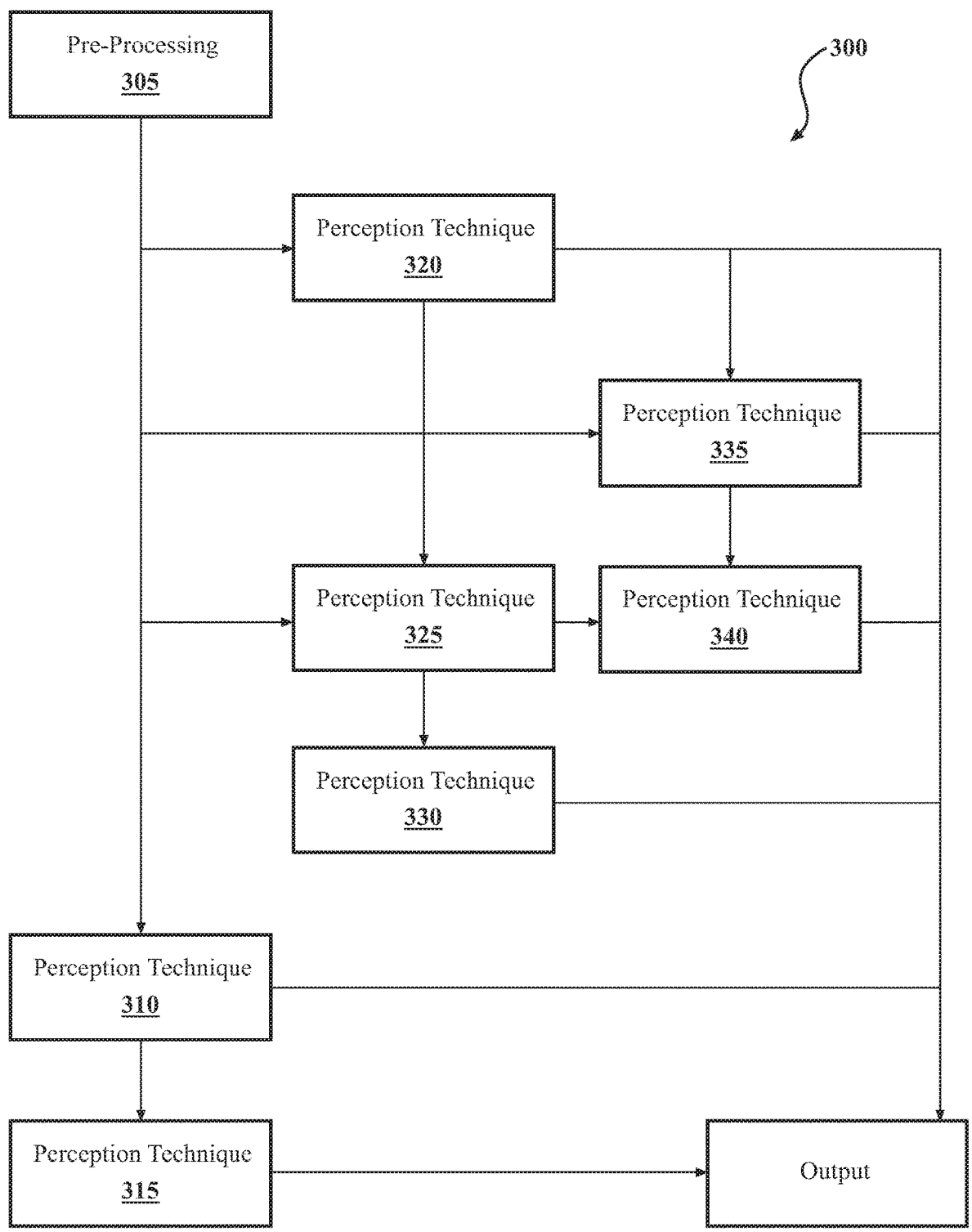
FIG. 3 illustrates one embodiment of a hierarchical structure of the human-based perception model.

One embodiment of a general structure 300 of the human-based perception model 260 is illustrated in FIG. 3. As an initial note, the structure 300 illustrated in FIG. 3 is provided as an abstraction of the model 260 for purposes of explanation. Thus, as implemented, the model 260, in one embodiment, is a machine learning algorithm such as a neural network. In one approach, the model 260 includes multiple neural networks and/or other machine learning algorithms that are, for example, arranged in a hierarchical structure. In still further aspects, the model 260 is a cost-aware cascaded classifier with various levels of processing that are implemented as separate neural networks and which can be successively activated when a previous layer does not provide a reasonably sufficient determination.

In either case, as shown in FIG. 3, the structure 300 includes a pre-processing mechanism 305 and a plurality of separate perception techniques 310, 315, 320, 325, 330, 335, 340, and 345. The pre-processing mechanism 305 is, in one embodiment, a machine learning algorithm that scans the sensor data 250 in real-time as the sensor data 250 is received for distinguishing attributes that inform decision making elements about which approaches to further processing the sensor data 250 may be most efficient. In general, the pre-processing mechanism is trained using the training dataset about human perception techniques as previously described.

Thus, the pre-processing mechanism 305 may scan for attributes that are correlated with particular conditions of the surrounding environment, traffic, and so on. For example, the attributes may include light conditions (e.g., bright vs. dark), weather (snow, rain, etc.), traffic density, road type, proximity of various objects/obstacles, patterns of motion, and so on. Accordingly, the pre-processing mechanism 305 is itself a perception technique that processes broader aspects of the surrounding environment in order to ascertain how the sensor data 250 is to be processed. As a general matter, the pre-processing mechanism 305 is not specifically programmed to detect the listed attributes but may use such attributes as learned from the training dataset.

In either case, the pre-processing mechanism 305 of the model 260 correlates the attributes with the various perception techniques 310-340. The perception techniques 310-340 are shown as an example set of techniques. In further approaches, the model 260 can reference more or fewer techniques. Moreover, while the techniques 310-340 are shown as being integrated as part of the structure 300 of the model 260, in one embodiment, the techniques are separate from the model 260, and the model 260 indicates selections of the techniques as an output. In either case, in FIG. 3, the techniques 310-340 are arranged in tiers according to computational costs associated with executing the respective techniques.

For example, techniques 310 and 315 are arranged in a first tier, techniques 320, 325, and 330 are in a second tier, and techniques 335 and 340 are arranged in a second tier. In general, each tier of techniques represents additional computational costs that is associated with, for example, a finer granularity of processing, additional iterations, increased resolution of processed input data, and so on. Moreover, the separate techniques can also be cascaded such if one approach provides an insufficient result then an alternate approach of equal or greater cost may be executed. Additionally, in one embodiment, the techniques are cascaded in a hierarchical form such that multiple techniques are executed to achieve a perception result. In such a case, an output of previous techniques are provided as inputs to subsequent techniques in order to, for example, provide combined processing over the sensor data 250 and provide complex perceptions therefrom.

Moreover, the techniques themselves can include such machine vision and perception algorithms as image filtering, object recognition techniques, pattern detection, semantic segmentation, lane detection, obstacle detection, image segmentation (e.g., open space segmentation, bounding box segmentation, super-pixel segmentation, pixel segmentation), and so on. Consequently, an output of the human-based perception model 260 is generally to provide information that informs various systems of the vehicle 100 to perform different tasks. In one embodiment, the information provided by the model 260 is to inform the autonomous driving module 160 about how to control the vehicle 100 autonomously, or, at least semi-autonomously.

In various approaches, the information that is provided as the output can vary. For example, in an end-to-end approach, the human-based model 260 can be implemented to provide driving controls for autonomously controlling the vehicle 100. Alternatively, in one embodiment, the model 260 provides perceptions (e.g., obstacle maps, object recognition, scene recognition, lane recognition, SLAM, etc.) from processing the sensor data 250, while in further aspects, the model 260 provides an indication of which techniques to execute on the sensor data 250 in order to efficiently process the sensor data 250. In either case, the selection module 220 executes the human-based perception model to at least determine which of the perception techniques to use when processing the sensor data 250.

In one embodiment, the sensor module 230 generally includes instructions that function to control the processor 110 to analyze the sensor data 250 using the selected one or more perception techniques to perceive characteristics of the surrounding environment that pertain to autonomously controlling the vehicle. Accordingly, the sensor module 230, in one embodiment, further implements the human-based model 260 to execute Furthermore, as will be discussed in greater detail subsequently, the sensor module 230 can execute the multiple perception techniques in a hierarchy in order to ensure that the perception system 170 provides a sufficient determination of various aspects included within the sensor data 250. As an additional aspect, the sensor module 230, in one embodiment, autonomously controls the vehicle 100 according to the characteristics provided from processing the sensor data 250. Thus, the sensor module 230, in one approach, uses the outputs of the perception techniques as a manner of perceiving the surrounding environment and determining how to control the vehicle 100. In further aspects, the sensor module 230 provides the outputs of the perception techniques to the autonomous driving module 160 and, thus, operates in combination with the autonomous driving module 160 to autonomously control the vehicle 100 to navigate through the surrounding environment. In this way, the perception system 170 can efficiently process the sensor data 250 and facilitate autonomous operation of the vehicle 100.

Figure 4:
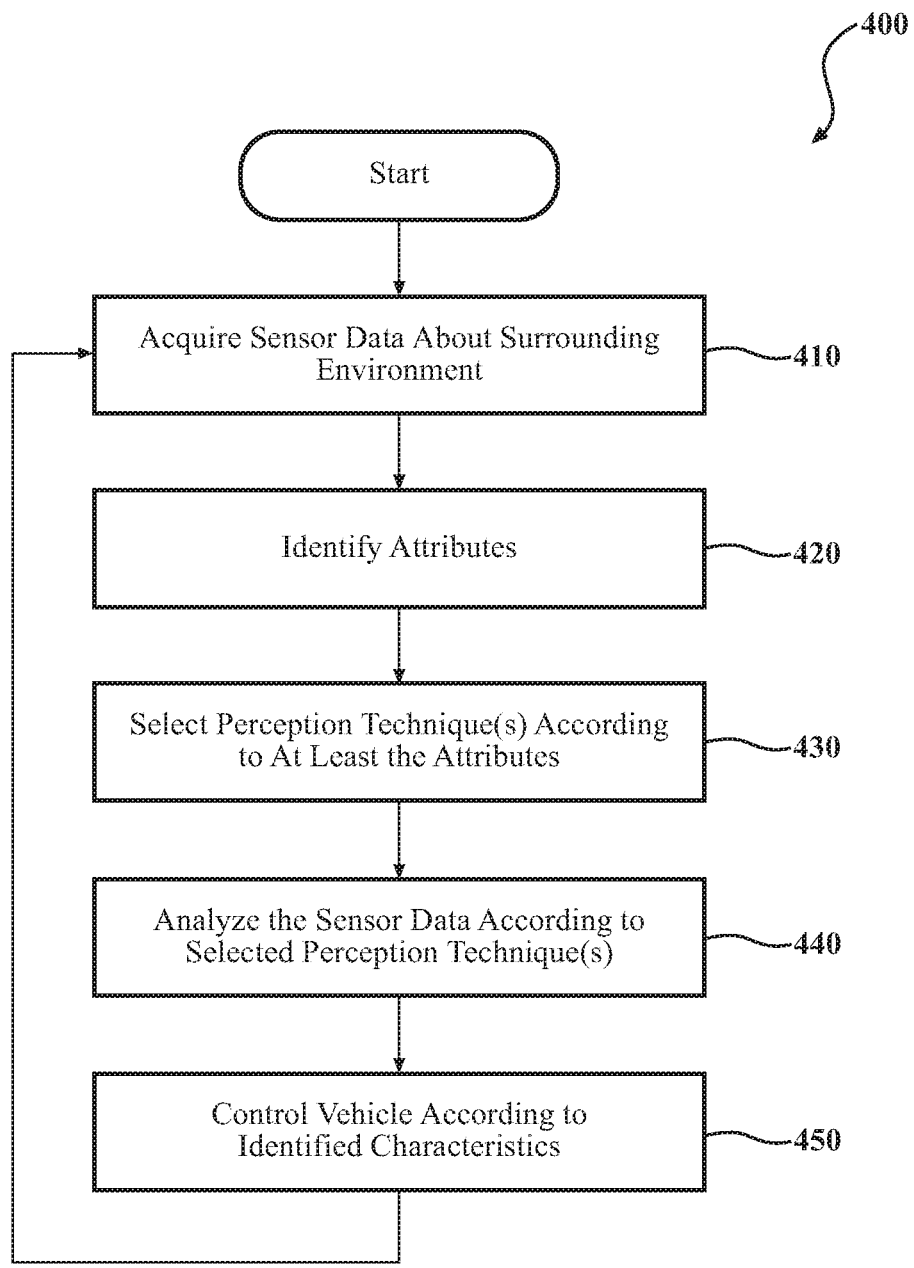
FIG. 4 illustrates one embodiment of a method associated with adaptively processing sensor data to focus on aspects relevant to autonomously controlling the vehicle.

Additional aspects of dynamically adapting how the vehicle 100 perceives the surrounding environment will be discussed in relation to FIG. 4. FIG. 4 illustrates a flowchart of a method 400 that is associated with using a human-based perception model to adapt how sensor data 250 is translated to support perceiving a surrounding environment of an autonomous vehicle. Method 400 will be discussed from the perspective of the perception system 170 of FIGS. 1, and 2. While method 400 is discussed in combination with the perception system 170, it should be appreciated that the method 400 is not limited to being implemented within perception system 170, but is instead one example of a system that may implement the method 300.

At 410, the selection module 220 controls a sensor of the vehicle to scan the surrounding environment. In one embodiment, the selection module 220 controls the LIDAR sensor 124 to produce the scan data 250 as a 3D point cloud representing the surrounding environment. Alternatively, or additionally, the selection module 220 controls a camera 126 to acquire images of the surrounding environment as the scan data 250. Moreover, in further embodiments, the selection module 220 controls the one or more sensors of the sensor system 120 to at least semi-continuously scan the surrounding environment and provide the scan data 250. Thus, the selection module 220, in one embodiment, iteratively executes the functions discussed at blocks 410-450 to acquire the scan data 250 and provide information therefrom. Furthermore, the selection module 220, in one embodiment, executes one or more of the noted functions in parallel for separate observations in order to maintain updated perceptions.

At 420, the selection module 220 identifies attributes of the sensor data 250. In one embodiment, the selection module 220 identifies the attributes of the sensor data 250 to determine distinguishing aspects or a signature of the surrounding environment that can inform the selection module 220 about which of the perception techniques may be well suited for processing the sensor data 250. As previously noted, in one approach, the selection module 220 executes the human-based perception model 260 to identify the attributes. Because the human-based perception model 260 is trained according to how a human perceives a surrounding environment, the model 260 includes learned information that embodies various attributes that trigger processing according to particular techniques.

By way example, the selection module 220 via the model 260 can identify attributes that affect how the one or more sensors perceive the surrounding environment. Those attributes that may influence perception can include atmospheric conditions (e.g., weather, lighting, etc.), types of environments (e.g., urban vs. rural), traffic density, and so on. Moreover, the attributes can also include attributes that are associated with autonomously controlling the vehicle such as points of interest in the surrounding environment (e.g., navigation-related POIs), objects in the surrounding environment, patterns of movement, features of a roadway on which the vehicle is traveling, and so on. As a general matter, however, the set of attributes are not limited nor are the attributes predefined. Instead, the training of the model 260 causes the model 260 to independently learn which attributes indicate markers of which perception techniques should be employed.

At 430, the selection module 220 selects one or more of the perception techniques with which to process the sensor data 250. In one embodiment, the selection module 220 initiates a pre-processing mechanism in the model 260 to characterize the sensor data 250 according to the attributes from 420. Thus, the model 260 determines which of the plurality of perception techniques provide the perception of the surrounding environment that satisfies a perception threshold while efficiently processing the sensor data 250.

In one embodiment, the perception threshold indicates an extent of information about the perceived characteristics of the surrounding environment that is adequate to use such data when autonomously controlling the vehicle. Thus, by way of example, the perception threshold can indicate a minimum resolution for discerning lane markers, a certainty for identifying objects and associated locations thereof, a precision for determined trajectories of the objects, and, more generally, an overall certainty of aspects relating to control of the vehicle within the surrounding environment.

Accordingly, the selection module 220 can use the model 260 to select one or more perception technique from a plurality of perception techniques according to which of the plurality of perception techniques efficiently process the sensor data 250. In one approach, the selection module 220 prioritizes minimizing an amount of the sensor data 250 that is to be analyzed to achieve sufficient perception. In further aspects, the selection module 220 can priority a particular perception technique that is less computationally intensive and/or that operates more quickly. In still further aspects, the selection module 220 can weigh both factors when selecting the perception techniques. Of course, when implementing the human-based perception model 260, the particular weights between how the various techniques are selected are learned by the model 260 according to the training data.

In either case, as a general principle of improving the efficiency of how the sensor data 250 is processed, the perception system 170 implements the plurality of perception techniques to improve a quantity and a quality of the sensor data 250 that is loaded and analyzed in order to satisfy the perception threshold. In this way, the perception system 170 focuses perception by the one or more sensors of the vehicle 100 to a particular region of the surrounding environment that includes relevant information for autonomously controlling the vehicle 100. Thus, as part of selecting the particular approach, certain portions of the sensor data 250 that relate to irrelevant aspects may be discarded instead of being further processed.

At 440, the sensor module 230 analyzes the sensor data 250 using the selected perception technique(s) to perceive various characteristics/aspects of the surrounding environment. In one embodiment, the perception techniques are integrated with the human-based perception module 260 in the form of, for example, a cascaded classifier or hierarchical arrangement of processing techniques. In either case, the sensor module 230 executes the model 260 including the noted perception techniques to perceive characteristics of the surrounding environment that pertain to autonomously controlling the vehicle 100. Thus, the sensor module 230 causes selective ones of the perception techniques to be executed in order to improve the efficiency of perception in contrast to a brute force approach and thus to focus the perception on particular sub-regions of the environment and using techniques that are optimized according to a particular perception task. In this way, the system 170 can avoid processing unrelated portions of the sensor data 250 and thus reduce computational overhead. Moreover, not only does processing a subset of the sensor data 250 reduce computational overhead but processing the sensor data 250 in this way can permit the use of more specialized perception techniques that are focused on particular types of data. Thus, additional improvements in the accuracy of perception can also be realized.

As a further aspect, the sensor module 230, in one embodiment, monitors the analysis of the sensor data 250 in order to recognize aspects of the surrounding environment that are to be further analyzed. Such aspects may include unexpected developments that arise from the initial analysis, and that may require selecting additional perception techniques for the further analysis. In either case, the sensor module 230 adaptively implements the model 260 in order to permit adjustments to how the sensor data 250 is analyzed.

Moreover, the sensor module 230 can execute determinations according to the hierarchical arrangement of the perception techniques as embodied in the model 260. That is, depending on the certainty of results from the analysis, the sensor module 230 can determine that further processing is necessary or not. For example, as part of analyzing the sensor data 250, the model 260 provides the result as a soft decision. The soft decision indicates a percentage likelihood associated with the particular decision. Thus, the sensor module 230, in one approach, compares the soft decision with a perception threshold and executes a further one of the processing techniques if the soft decision does not satisfy the threshold. In this way, the perception system can adaptively process the sensor data 250 but also ensure that the provided determination adequately represent the characteristics of the environment.

At 450, the sensor module 230 autonomously controls the vehicle 100 according to the characteristics. In one embodiment, the sensor module 230 controls the vehicle 100 in concert with the autonomous driving module 160. That is, for example, the sensor module 230 can continuously update information about the surrounding environment that is accepted by the module 160 as inputs for determining how to control the vehicle 100. Alternatively, the sensor module 230 can provide indications As further explanation of how the perception system 170 improves the perception of the vehicle 100, consider FIG. 5. FIG. 5 illustrates an example view of a surrounding environment of the vehicle 100 as may be captured by the sensor system 120. Accordingly, the view 500 includes aspects that may directly affect control of the vehicle 100 and also includes ancillary aspects that may be extraneous to analysis of the sensor data 250 for purposes of controlling the vehicle. For example, as depicted the view 500 includes a truck 505, a pedestrian 510, a roadway 515 with lane markers, buildings 520 that are adjacent to the roadway 515, traffic signs 525, trees and other vegetation 530, and elements in the sky such as the sun 535 and clouds.

Accordingly, the various depicted aspects of the view 500 have varying importance or influence over how the vehicle 100 is being controlled. That is, objects such as the truck 505 and the pedestrian 510 represent potential obstacles or dangers that are in motion in an area proximate to the vehicle 100. Other aspects of the surrounding environment such as the roadway 515 and the traffic sign 525 while important, do not necessarily represent objects that need to be distinguished with a high resolution or certainty. Moreover, the remaining aspects including static objects such as the buildings 520, the trees 530, and distant objects in the sky, do not generally affect how the vehicle 100 is to be controlled.

Therefore, in one embodiment, the perception system 170 through implementing and executing the human-based perception model 260 identifies attributes of the view 500. Thus, the perception system 170 may identify movement patterns of the truck 505 and the pedestrian 510 while further identifying generally static monolithic structures as the buildings 520. Consequently, in one example, the perception system 170 selects perception techniques particular to the detected motion patterns of the truck 505 and the pedestrian 510 and further focuses the processing of those perception techniques on regions directly proximate to the respective objects. Moreover, the perception system 170 may also select a generalized lane identification algorithm to broadly discern meets and bounds of the roadway while using the same or an additional technique to generically determine the presence of the buildings 520.

Further aspects of the view 500 can be wholly ignored by the perception system 170. For example, perception system 170 may not consider objects in the sky such as planes, helicopters, and so on, nor the clouds or the sun 535. While the system 170 does not directly perceive such aspects, the perception system 170 does consider atmospheric conditions that influence the operation of the vehicle and perception of the environment such as lighting, weather, and so on. Accordingly, a particular perception technique that is implemented to recognize the truck 505 and track a trajectory of the truck 505 may be adjusted according to the particular atmospheric conditions. In either case, the view 500 represents how the perception system 170 selectively focuses perception and techniques used for perception on particular aspects of the environment instead of using a brute force approach that distinguishes all aspects with high resolution. In this way, the perception system 170 not only improves perception through reducing computational overhead but also improves accuracy through the availability of additional computational resources that can be shifted onto aspects that are directly relevant to controlling the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the perception system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the perception system 170, and/or the autonomous driving module(s) 160 may control some or all of these vehicle systems 140 and, thus, may be partially or fully autonomous.

The processor(s) 110, the perception system 170, and/or the autonomous driving module(s) 160 can be operatively connected to communicate with the various vehicle systems 140 and/or individual components thereof. For example, returning to FIG. 1, the processor(s) 110, the perception system 170, and/or the autonomous driving module(s) 160 can be in communication to send and/or receive information from the various vehicle systems 140 to control the movement, speed, maneuvering, heading, direction, etc. of the vehicle 100. The processor(s) 110, the perception system 170, and/or the autonomous driving module(s) 160 may control some or all of these vehicle systems 140.

The processor(s) 110, the perception system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the perception system 170, and/or the autonomous driving module(s) 160 can control the direction and/or speed of the vehicle 100. The processor(s) 110, the perception system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the perception system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the sensor module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A perception system for selectively processing sensor data to perceive aspects of a surrounding environment of a vehicle, comprising:
   one or more processors;
   a memory communicably coupled to the one or more processors and storing:
      a selection module including instructions that when executed by the one or more processors cause the one or more processors to, in response to identifying attributes of the surrounding environment from the sensor data of one or more sensors, select a perception technique from a plurality of perception techniques according to a human-based perception model that correlates the plurality of perception techniques with the attributes to identify which of the plurality of perception techniques efficiently process the sensor data; and
      a sensor module including instructions that when executed by the one or more processors cause the one or more processors to analyze the sensor data using the perception technique to perceive characteristics of the surrounding environment that pertain to autonomously controlling the vehicle, wherein the plurality of perception techniques include perception algorithms and characteristics for operating the perception algorithms that control analyzing the sensor data to efficiently provide perceptions of the surrounding environment, and
      wherein the sensor module includes instructions to autonomously control the vehicle according to the characteristics to navigate through the surrounding environment.

2. The perception system of claim 1, wherein the selection module includes instructions to select the perception technique including instructions to use the human-based perception model to initially analyze the sensor data and correlate the attributes with one of the plurality of perception techniques,
   wherein the selection module includes instructions to execute the human-based perception model to analyze the attributes through a pre-processing mechanism that characterizes the sensor data according to distinguishing features and determines which of the plurality of perception techniques provide perception of the surrounding environment that satisfies a perception threshold while efficiently processing the sensor data, and
   wherein the perception threshold is an extent of perception of aspects of the surrounding environment to accurately control the vehicle for circumstances associated with the attributes.

3. The perception system of claim 2, wherein the sensor module includes instructions to train the human-based perception model according to correlations between the perception techniques and human-based techniques for perceiving the surrounding environment, and
   wherein the selection module includes instructions to execute the human-based perception model to correlate the characteristics of the surrounding environment with the plurality of perception techniques to improve analysis of the sensor data by minimizing an amount of the sensor data that is to be analyzed to achieve sufficient perception when controlling the vehicle autonomously.

4. The perception system of claim 2, wherein the selection module includes instructions to identify the attributes including instructions to recognize aspects of the surrounding environment that i) affect how the one or more sensors perceive the surrounding environment and ii) that are associated with autonomously controlling the vehicle, and wherein the aspects include one or more of a point of interest in the surrounding environment, objects in the surrounding environment, patterns of movement, and features of a roadway on which the vehicle is traveling.

5. The perception system of claim 1,
   wherein the selection module includes instructions to select the perception technique including instructions to select the perception technique according to a quantity and a quality of the sensor data for satisfying a perception threshold for perceiving the characteristics to an extent that is adequate to autonomously control the vehicle.

6. The perception system of claim 1, wherein the selection module includes instructions to select the perception technique from the plurality of perception techniques to focus perception by the one or more sensors of the vehicle to a particular region of the surrounding environment that includes relevant information for autonomously controlling the vehicle.

7. The perception system of claim 1, wherein the sensor module includes instructions to:
   acquire, using one or more sensors of the vehicle, the sensor data about the surrounding environment, wherein the sensor data includes information about the attributes of the surrounding environment including objects located in the surrounding environment,
   wherein the sensor module includes instructions to analyze the sensor data including instructions to recognize aspects of the surrounding environment that are to be further analyzed and selecting an additional one of the plurality of perception techniques for the further analysis, and
   wherein the plurality of perception techniques are organized into a hierarchical arrangement according to an extent of processing and sensor data associated with the respective ones of the plurality of perception techniques.

8. The perception system of claim 1, wherein the vehicle is an autonomous vehicle that operates according to at least a standard for semi-autonomously navigating.

9. A non-transitory computer-readable medium for selectively processing sensor data to perceive aspects of a surrounding environment of a vehicle and including instructions that when executed by one or more processors cause the one or more processors to:
   in response to identifying attributes of the surrounding environment from the sensor data of one or more sensors, select a perception technique from a plurality of perception techniques according to a human-based perception model that correlates the plurality of perception techniques with the attributes to identify which of the plurality of perception techniques efficiently process the sensor data;
   analyze the sensor data using the perception technique to perceive characteristics of the surrounding environment that pertain to autonomously controlling the vehicle, wherein the plurality of perception techniques include perception algorithms and characteristics for operating the perception algorithms that control analyzing the sensor data to efficiently provide perception of the surrounding environment; and
autonomously control the vehicle according to the characteristics to navigate through the surrounding environment.

10. The non-transitory computer-readable medium of claim 9, wherein the instructions to select the perception technique include instructions to use the human-based perception model to initially analyze the sensor data and correlate the attributes with one of the plurality of perception techniques,
wherein the instructions include instructions to execute the human-based perception model to analyze the attributes through a pre-processing mechanism that characterizes the sensor data according to distinguishing features and determines which of the plurality of perception techniques provide perception of the surrounding environment that satisfies a perception threshold while efficiently processing the sensor data, and
wherein the perception threshold is an extent of perception of aspects of the surrounding environment to accurately control the vehicle for circumstances associated with the attributes.

11. The non-transitory computer-readable medium of claim 10, wherein the instructions to train the human-based perception model according to correlations between the perception techniques and human-based techniques for perceiving the surrounding environment, and
wherein the instructions to select include instructions to execute the human-based perception model to correlate the characteristics of the surrounding environment with the plurality of perception techniques to improve analysis of the sensor data by minimizing an amount of the sensor data that is to be analyzed to achieve sufficient perception when controlling the vehicle autonomously.

12. The non-transitory computer-readable medium of claim 10, wherein the instructions to identify the attributes include instructions to recognize aspects of the surrounding environment that i) affect how the one or more sensors perceive the surrounding environment and ii) that are associated with autonomously controlling the vehicle, and wherein the aspects include one or more of a point of interest in the surrounding environment, objects in the surrounding environment, patterns of movement, and features of a roadway on which the vehicle is traveling.

13. The non-transitory computer-readable medium of claim 9,
wherein the instructions to select the perception technique include instructions to select the perception technique according to a quantity and a quality of the sensor data for satisfying a perception threshold for perceiving the characteristics to an extent that is adequate to autonomously control the vehicle.

14. A method of selectively processing sensor data to perceive aspects of a surrounding environment of a vehicle, comprising:
in response to identifying attributes of the surrounding environment from sensor data of one or more sensors, selecting a perception technique from a plurality of perception techniques according to a human-based perception model that correlates the plurality of perception techniques with the attributes to identify which of the plurality of perception techniques efficiently process the sensor data;
analyzing the sensor data using the perception technique to perceive characteristics of the surrounding environment that pertain to autonomously controlling the vehicle, wherein the plurality of perception techniques include perception algorithms and characteristics for operating the perception algorithms to control analyzing the sensor data to efficiently provide perception of the surrounding environment; and
autonomously controlling the vehicle according to the characteristics to navigate through the surrounding environment.

15. The method of claim 14, wherein selecting the perception technique includes using the human-based perception model to initially analyze the sensor data and correlate the attributes with one of the plurality of perception techniques,
wherein the human-based perception model analyzes the attributes through a pre-processing mechanism to characterize the sensor data according to distinguishing features and determine which of the plurality of perception techniques provide perception of the surrounding environment that satisfies a perception threshold while efficiently processing the sensor data, and
wherein the perception threshold is an extent of perception of aspects of the surrounding environment to accurately control the vehicle for circumstances associated with the attributes.

16. The method of claim 15, wherein the human-based perception model is trained according to correlations between the perception techniques and human-based techniques for perceiving the surrounding environment, and
wherein the human-based perception model correlates the characteristics of the surrounding environment with the plurality of perception techniques to improve analysis of the sensor data by minimizing an amount of the sensor data that is to be analyzed to achieve sufficient perception when controlling the vehicle autonomously.

17. The method of claim 15, wherein identifying the attributes includes recognizing aspects of the surrounding environment that i) affect how the one or more sensors perceive the surrounding environment and ii) that are associated with autonomously controlling the vehicle, and wherein the aspects include one or more of a point of interest in the surrounding environment, objects in the surrounding environment, patterns of movement, and features of a roadway on which the vehicle is traveling.

18. The method of claim 14,
wherein selecting the perception technique includes selecting the perception technique according to a quantity and a quality of the sensor data for satisfying a perception threshold for perceiving the characteristics to an extent that is adequate to autonomously control the vehicle.

19. The method of claim 14, wherein selecting the perception technique from the plurality of perception techniques focuses perception by the one or more sensors of the vehicle to a particular region of the surrounding environment that includes relevant information for autonomously controlling the vehicle.

20. The method of claim 14, further comprising:
acquiring, using one or more sensors of the vehicle, the sensor data about the surrounding environment, wherein the sensor data includes information about the attributes of the surrounding environment including objects located in the surrounding environment,
wherein analyzing the sensor data includes recognizing aspects of the surrounding environment that are to be further analyzed and selecting an additional one of the plurality of perception techniques for the further analysis, and wherein the plurality of perception techniques are organized into a hierarchical arrangement according to an extent of processing and sensor data associated with the respective ones of the plurality of perception techniques.

* * * * *